Dec. 30, 1958 R. O. WYNN 2,866,253
GATE VALVE
Filed March 25, 1954
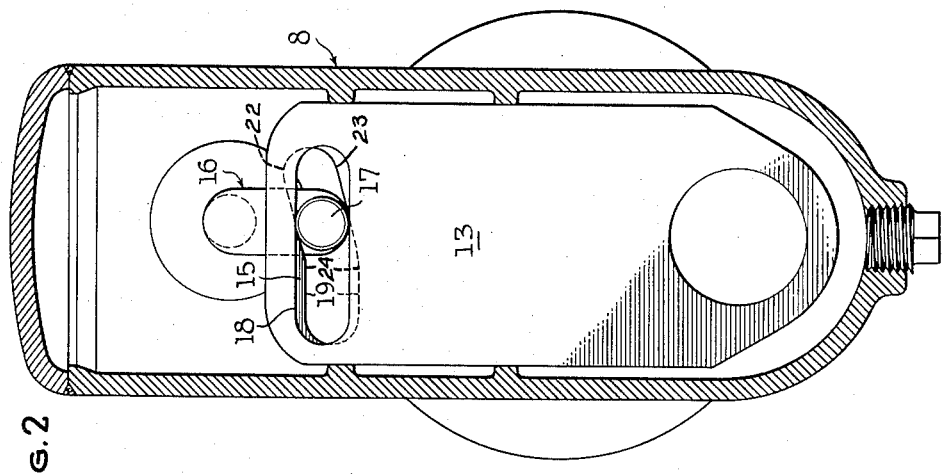
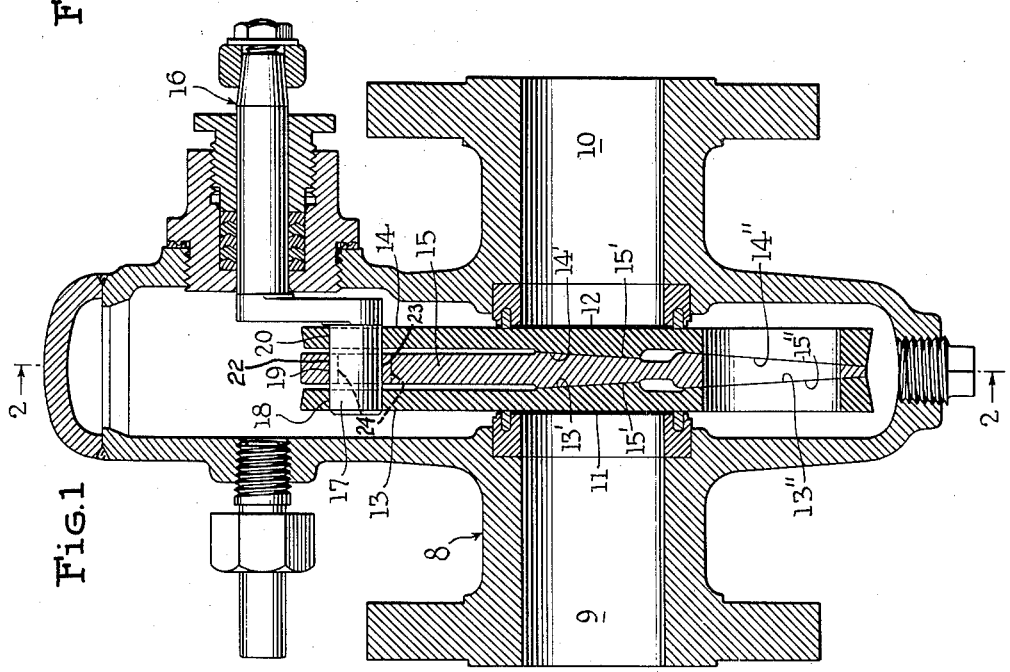
INVENTOR
Robert O. Wynn
BY
ATTORNEY

2,866,253

GATE VALVE

Robert O. Wynn, Houston, Tex., assignor, by mesne assignments, to ACF Industries, Incorporated, a corporation of New Jersey Application March 25, 1954, Serial No. 418,577

7 Claims. (Cl. 251—196)

This invention relates to valves and more particularly to through conduit gate valves. It has particular application in that type of gate valve in which the gate comprises a multipart assembly mounted for rectilinear movement within the valve body, and further adapted to be expanded laterally into sealing engagement with the up and downstream seats in both the open and closed positions of the valve. This invention includes the application of a quick opening and closing operator, for a laterally-expansible three-part gate assembly, and at the same time provides means for positively effecting the lateral expansion of the gate assembly, which is necessary to seal the valve in both open and closed position. A similar valve, on which the instant invention constitutes an improvement, is shown and described in my copending application Serial No. 366,981, filed July 9, 1953, now Patent No. 2,823,888 granted Feb. 18, 1958.

It is the primary object of this invention, therefore, to provide a simple, quick-opening and closing means for a valve of the laterally-expansible gate type, and in which the quick-opening and closing means serves, at the same time, to positively effect the desired lateral expansion of the gate assembly.

In the valve disclosed in the aforementioned copending application, the gate comprises a two-part assembly. In the instant invention the gate comprises a three-part assembly, and in operation, results in less wear on the sealing surfaces by reason of reduced relative sliding movement between the sealing surfaces during the expansion and contraction of the gate assembly to form and break the seal respectively on the up and downstream seats. In general, this reduced wear is achieved by so correlating the construction of the three-part gate assembly with the operating means, that once the outer members of the assembly are expanded into engagement with the valve seats, further expansion takes place by reason of relative rectilinear movement in the direction of travel of the gate largely between the inner member of the assembly and the outer two members, with substantially no further rectilinear movement of the outer two members relative to the valve seats. The same effect is inherent in the operation of this valve whether expanding the gate assembly into sealing engagement with the seats, or breaking the seal to permit the gate to move freely between open and closed position.

Other objects will be apparent from the following description when read in conjunction with the attached sheet of drawings in which:

Figure 1 is a sectional view in side elevation of a valve embodying the instant invention; and Figure 2 is a section on line 2—2 of Figure 1.

Referring now to Fig. 1, the valve includes a body 8 having through conduit portions 9 and 10, the latter terminating inwardly of the body in valve seats 11 and 12. Either of these seats may, of course, be placed in the upstream or downstream position when the valve is placed in a line carrying fluid under pressure.

The gate assembly, which is mounted for rectilinear movement within the valve body to open and close the valve, includes three ported members arranged in contiguous stacked relation. The outer two of said members 13 and 14 each have parallel outer sealing faces to engage the valve seats. The inner faces of members 13 and 14 include tapered faces 13', 13", and 14' and 14". The third member 15 of the gate assembly is supported between the outer members 13 and 14 and includes opposite pairs of downwardly converging tapered wedging faces 15' and 15" for engagement with the correspondingly tapered inner faces of members 13 and 14. Relative movement, therefore, between the inner member 15 and the outer two members 13 and 14 results in a wedging or unwedging action of the gate assembly, that is an axial movement of members 13 and 14 relative to passages 9 and 10 depending on the direction of relative movement.

As shown in Figures 1 and 2, the gate assembly is in its closed position and in order to move the assembly to open position, the inner member 15 must first be moved upwardly to allow the gate assembly to contract laterally or in other words move axially of passages 9 and 10 in order that it may move freely to open position.

Movement of the assembly from open to closed position and vice versa is effected by rotation of the operator 16. The latter includes a crank or cam portion 17 which is offset from the axis of rotation of the main shaft of operator 16. This offset portion extends through elongated slotted openings 18, 19 and 20 formed in the upper portion of each of the three members 13, 15 and 14, respectively, of the gate assembly. The slotted openings 18 and 20 in the members 13 and 14 each extend transversely of the member with the long sides of the slots parallel and in a horizontal position, as viewed in Fig. 2. The opening 19 in member 15, however, has an end portion which is inclined downwardly with respect to the slotted openings 18 and 20 and is formed with upper and lower inclined surfaces 22 and 23, respectively. This inclined portion of the slot merges into a short slot having horizontal sides 24 parallel but offset downwardly from the sides of slots 18 and 20 when the valve is in full open or closed position. It will be apparent, therefore, that movement of the operator in a clockwise direction causes the crank 17 to move along the upper downwardly inclined portion 22 into portion 24 and this results in a positive upward movement of the central member 15. During this clockwise rotation the end members 13 and 14 will be moved upward slightly, but at a much slower rate than member 15. If the crank 17 is in a final position to the right of the position shown, then clockwise rotation will cause the same upward movement of part 15, but will cause a slight downward movement of parts 13 and 14, thus increasing the rate of movement of the wedging faces and more quickly unwedging the parts. It will also be seen that rotation of the operator 16 in a clockwise direction results in an initial relatively large upward movement of gate member 15 with little or no upward movement of members 13 and 14. Following this initial rotation of the operator, however, it will be seen that the three parts of the gate assembly will then move together as long as the crank 17 remains in the left hand portion of the gate assembly openings as viewed in Figure 2. Once the operator has moved slightly less than 180°, however, further movement of the operator will result in the crank 17 engaging the lower surface 23 of inclined slot 24 forcing member 15 downwardly. This will result in little or no movement of the members 13 and 14 relative to the valve seats 11 and 12, but will result in a relatively large downward movement of the member 15 which is effective to expand the gate assembly normally of the valve seats or in other words axially of passages 9 and 10 to create a positive seal between the members 13 and 14 and the seats 11 and 12 respectively.

Also in cases where greater wedging is required or desirable the rotation of the crank counter-clockwise from the position of Fig. 2 will cause the crank to engage lower surface 23 forcing part 15 down while the parts 13 and 14 will be lifted thereby increasing the wedging action. In other words on clockwise rotation from the position of Fig. 2 the parts 13, 14 and 15 unwedge by moving in the same direction at different rates while on counter-clockwise rotation the wedging action is increased by the parts 13, 14 moving in an opposite direction to the movement of part 15.

This same action occurs upon opening of the valve that is the initial opening will, with the crank to the right of its position shown in Fig. 2, cause the intermediate member to move upwardly while the end members move downward slightly then, as the crank continues its clockwise rotation the three members move in the same direction but at different rates until the slots are aligned, after which they move upward in unison. To return to valve closed position, counter-clockwise rotation of the operator is necessary with the unwedging and wedging action the same as previously described. Initial movement of the gate is substantially limited to inner member 15 due to the inclined surfaces 22 and 23 of opening 19 and the extremely small movements of 13 and 14. This permits lateral contraction of the gate assembly without any substantial wiping action between the seats and members 13 and 14 and then members 13, 14, and 15 move together vertically until the crank 17 re-enters the right-hand portion of opening 19, at which time the gate assembly is again expanded into sealing engagement with the valve seats without any substantial wiping action by relative rectilinear movement of member 15 with respect to members 13 and 14.

From the foregoing, it will be apparent that there is shown and disclosed herein a new and useful valve and that there will be many equivalents within the scope of the appended claims.

I claim:

1. In a gate valve the combination of a housing forming a valve chamber having ports provided with opposed seats in the chamber, an expansible valve gate assembly mounted for guided rectilinear movement in the chamber transversely of said seats and ports to open and close the valve, said assembly including two end members adapted to bear on the valve seats and an intermediate member mounted between the end members for limited movement relative thereto, a wedge face formed on the intermediate member and engaging a mating wedge face on an end member to move the end member normally of the valve seats during relative movement between the members, and slot and cam means to move said intermediate and end members simultaneously in opposite rectilinear directions during initial opening movement to obtain rapid normal movement of the end members relative to the valve seats.

2. The structure of claim 1 characterized in that said means also moves the said members in the same rectilinear direction following the initial opening movement.

3. The structure of claim 1 characterized in that said means moves the end members in the same direction as the intermediate member but at a different rate of movement following the initial opening movement for a portion of the opening movement.

4. In a gate valve the combination of a housing forming a valve chamber having ports provided with opposed seats in the chamber, an expansible valve gate assembly mounted for guided rectilinear movement in the chamber transversely of said seats and ports to open and close the valve, said assembly including two end members adapted to bear on the valve seats and an intermediate member mounted between the end members for limited movement relative thereto, a wedge face formed on the intermediate member and engaging a mating wedge face on an end member to move the end member normally of the valve seats during relative movement between the members, and slot and cam means to move said intermediate member upwardly during opening of the valve and simultaneously to first move the end members downwardly then upwardly in unison with the intermediate member.

5. A through conduit gate valve comprising: a housing forming a valve chamber having aligned ports provided with opposed valve seats; an expansible valve gate assembly mounted for rectilinear movement transversely of said seats and ports to open and close the valve, said assembly including three ported members arranged in contiguous stacked relation, the outer two of said members having outer sealing faces to engage the valve seats, and the third member being supported between the said two outer members and having at least one surface which lies at an angle to the sealing surfaces for engagement with a similarly angled inner surface of at least one of said outer members to form a set of wedging surfaces effective upon relative displacement therebetween in the direction of movement of said assembly to expand said assembly normally of said seats to force said outer two members oppositely into sealing engagement with said seats; means defining an elongated opening in each of the outer two members and extending transversely thereof; means defining an elongated opening in the third member of said gate assembly, said last named opening including a portion which is inclined with respect to the openings in the outer two members, and a portion which is parallel to but offset vertically from said first named openings when the valve is open or closed; a shaft rotatably mounted in the valve body and having a crank portion within the valve body extending through said elongated openings and engaging the inclined portion of the third member opening, said crank moving along the inclined portion of the opening in the third member upon rotation of the shaft to lift the third member and bring the elongated openings into registry thereby unwedging the outer two members and allowing them to move normally of the valve seats, said crank also moving along the horizontal portion of the openings in the members to move the unwedged assembly transversely of the ports.

6. A valve as defined by claim 5 in which the third gate assembly member includes at least one pair of tapered surfaces one on each side thereof for engagement with corresponding surfaces on each of the outer members to form at least two sets of opposed wedging surfaces effective upon relative displacement therebetween in a direction parallel to the movement of said assembly, to expand said assembly normally of said seats to force said outer two members oppositely into sealing engagement with said seats.

7. A through conduit gate valve comprising: a housing forming a valve chamber having aligned ports provided with opposed valve seats; an expansible valve gate assembly mounted for rectilinear movement transversely of said seats and ports to open and close the valve, said assembly including three ported members arranged in contiguous stacked relation, the outer two of said members having outer sealing faces to engage the valve seats, and the third member being supported between the said two outer members and having oppositely disposed pairs of surfaces which lie at an angle to the sealing surfaces for engagement with correspondingly tapered inner surfaces on each of said outer members to form opposite pairs of wedging surfaces effective upon relative displacement therebetween in the direction of movement of said assembly, to expand said assembly normally of said seats to force said outer two members oppositely into sealing engagement with said seats; means defining an elongated opening in each of the outer two members and extending transversely thereof; means defining an elongated opening in the third member of said gate assembly, said last named opening including a portion which is inclined with respect to the openings in the outer two members, and a portion which is parallel to but offset vertically from said first named openings when valve is open or closed; a shaft rotatably mounted in the valve body, extending through one wall thereof and having a crank portion offset with respect to the shaft, said crank portion being received entirely within the valve body and extending through said elongated openings; whereby rotation of said shaft is effective to move said crank along the inclined portion to bring the elongated openings into registry to unwedge the valve gate assembly, and move along the inclined portion to force the elongated openings out of registry to positively wedge the gate assembly into sealing engagement with the valve seats adjacent each end of its path of travel.

References Cited in the file of this patent

UNITED STATES PATENTS

| | | |
|---|---|---|
| 146,796 | Wilson | Jan. 27, 1874 |
| 1,134,811 | Berger | Apr. 6, 1915 |
| 2,150,254 | Sorensen | Mar. 14, 1939 |
| 2,537,470 | Laurent | Jan. 9, 1951 |